United States Patent
Ferguson et al.

(10) Patent No.: US 9,654,738 B1
(45) Date of Patent: May 16, 2017

(54) USING MULTIPLE EXPOSURES TO IMPROVE IMAGE PROCESSING FOR AUTONOMOUS VEHICLES

(71) Applicant: Google Inc., Mountain View, CA (US)

(72) Inventors: David I. Ferguson, San Francisco, CA (US); Abhijit S. Ogale, Mountain View, CA (US)

(73) Assignee: Waymo LLC, Mountain View, CA (US)

(*) Notice: Subject to any disclaimer, the term of this patent is extended or adjusted under 35 U.S.C. 154(b) by 502 days.

(21) Appl. No.: 13/960,969

(22) Filed: Aug. 7, 2013

(51) Int. Cl.
 *H04N 7/18* (2006.01)
 *B60R 1/00* (2006.01)
 *G06K 9/00* (2006.01)

(52) U.S. Cl.
 CPC ............... *H04N 7/18* (2013.01); *B60R 1/00* (2013.01); *G06K 9/00791* (2013.01)

(58) Field of Classification Search
 None
 See application file for complete search history.

(56) References Cited

U.S. PATENT DOCUMENTS

| | | | |
|---|---|---|---|
| 8,134,480 B2 | 3/2012 | Onome et al. | |
| 2005/0219367 A1* | 10/2005 | Kanda | H04N 1/00209 348/207.2 |
| 2009/0040364 A1 | 2/2009 | Rubner | |
| 2009/0268963 A1* | 10/2009 | Kang | H04N 5/20 382/168 |
| 2010/0100268 A1* | 4/2010 | Zhang | B60W 30/09 701/25 |
| 2010/0103194 A1* | 4/2010 | Chen | G06T 5/50 345/629 |
| 2010/0309332 A1* | 12/2010 | Ueda | H04N 5/23293 348/229.1 |
| 2012/0262600 A1* | 10/2012 | Velarde | H04N 5/2355 348/223.1 |
| 2012/0308082 A1* | 12/2012 | Murao | G06K 9/00825 382/103 |
| 2013/0027564 A1 | 1/2013 | Solhusvik | |
| 2013/0027565 A1 | 1/2013 | Solhusvik et al. | |

* cited by examiner

*Primary Examiner* — Kate Luo
(74) *Attorney, Agent, or Firm* — Lerner, David, Littenberg, Krumholz & Mentlik, LLP (57) ABSTRACT

The invention relates to collecting different images using different camera parameters. As an example, a single camera may capture two different types of images: a dark exposure for light emitting objects and a normal exposure for passive objects. The camera may first capture an image. This first image may be processed to determine the ideal camera settings for capturing the average intensity of the environment. Fixed offset values may be added to these ideal camera settings and the dark exposure may be captured. The ideal camera settings are then used to capture a normal exposure, which in turn may be processed to determine new ideal camera settings. Again, the fixed offset values may be added to the new ideal camera settings and a dark exposure is captured. This process may repeat continuously and periodically, and the resulting images may be processed to identify emissive and passive objects.

20 Claims, 9 Drawing Sheets

USING MULTIPLE EXPOSURES TO IMPROVE IMAGE PROCESSING FOR AUTONOMOUS VEHICLES

BACKGROUND

Autonomous vehicles use various computing systems to aid in the transport of passengers from one location to another. Some autonomous vehicles may require some initial input or continuous input from an operator, such as a pilot, driver, or passenger. Other systems, for example autopilot systems, may be used only when the system has been engaged, which permits the operator to switch from a manual driving mode (where the operator exercises a high degree of control over the movement of the vehicle) to an autonomous driving mode (where the vehicle essentially drives itself) to modes that lie somewhere in between.

Many such vehicles process camera images to assist in detecting and identifying objects. In image processing for autonomous vehicles, certain tasks are easier to perform when an image is very dark and only displays light-emitting (emissive) sources such as detecting tail lights of other vehicles, detecting traffic lights, or flares. Other tasks require images that provide detailed information for non-emissive (or passive) sources such as detecting pedestrians or lane markers. High dynamic range (HDR) cameras may provide a large dynamic range in a single image allowing autonomous vehicles to use these images for many different types of tasks. However, if this hardware is unavailable, tuning camera parameters to get a single image configuration that will satisfy the requirements of more than one image processing task can be challenging or impossible. As an example, it can be very difficult to capture a single image that has characteristics that would allow the autonomous vehicle to clearly capture both emissive and passive objects, especially as lighting conditions can be constantly changing.

BRIEF SUMMARY

One aspect of the disclosure provides a method. The method includes processing an image of a scene to determine an exposure value for capturing an average amount of light for the scene with the camera; adding, by the processor, a fixed offset value to the exposure value to generate an adjusted exposure value; using the adjusted exposure value to capture a first exposure image with the camera, wherein the first exposure image is a dark exposure image; using the exposure value to capture a second exposure image with the camera; and using the first exposure image and the second exposure image to control a vehicle in an autonomous mode.

In one example, the method also includes using the first exposure image to identify an emissive object in the scene that emits light and using the identified emissive object to control the vehicle. In another example, the method also includes using the second exposure image to identify a passive object in the scene that does not emit light and using the identified passive object to control the vehicle. In another example, the second exposure image includes a second scene and the method also includes processing the light exposure image to determine a second exposure value for capturing an average amount of light for the second scene with the camera and using the second exposure value to capture a third exposure image with the camera. In this example, the method also includes adding the fixed offset value to the second exposure values to generate a second adjusted exposure value and using the adjusted exposure value to capture a fourth exposure image with the camera, wherein the fourth exposure image is a second dark exposure image. In another example, the exposure value is a gain value. In another example, the exposure value is a shutter time value. In another example, the exposure value is a white balance value.

Another aspect of the disclosure provides a method. The method includes processing an image of a scene to determine a exposure value for capturing an average amount of light for the scene with the camera; accessing memory to identify a fixed predetermined exposure value for capturing dark exposure images; capturing a first exposure image with the camera using the fixed predetermined exposure value, wherein the first exposure image is a dark exposure image; using the exposure value to capture a second exposure image with the camera; and using the first exposure image and the second exposure image to control a vehicle in an autonomous mode.

In one example, the second exposure image includes a second scene and the method also includes processing the second exposure image to determine a second exposure value for capturing an average amount of light for the second scene with the camera and using the second exposure value to capture a third exposure image with the camera.

A further aspect of the disclosure provides a system. The system includes a processor configured to process an image of a scene to determine a exposure value for capturing an average amount of light for the scene with the camera; add a fixed offset value to the exposure value to generate an adjusted exposure value; send instructions to use the adjusted exposure value to capture a first exposure image with a camera, wherein the first exposure image is a dark exposure image; send instructions to use the exposure value to capture a second exposure image with the camera; and use the first exposure image and the second exposure image to control a vehicle in an autonomous mode.

In one example, the processor is also configured to use the first exposure image to identify an emissive object in the scene that emits light and use the identified emissive object to control the vehicle. In another example, the processor is also configured to use the second exposure image to identify a passive object in the scene that does not emit light and use the identified passive object to control the vehicle. In another example, the light exposure image includes a second scene and the processor is also configured to process the second exposure image to determine a second exposure value for capturing an average amount of light for the second scene with the camera and send instructions to use the second exposure value to capture a third exposure image with the camera. In this example, the processor is also configured to add the fixed offset value to the second exposure value to generate a second adjusted exposure value and use the second adjusted exposure value to capture a fourth exposure image with the camera, wherein the fourth exposure image is a second dark exposure image. In another example, the system also includes the camera.

Yet another aspect of the disclosure provides a system. The system includes memory storing a fixed predetermined exposure value for capturing dark exposure images and a processor. The processor is configured to process an image of a scene to determine a exposure value for capturing an average amount of light for the scene with the camera; access the memory; send instructions for the camera to capture a first exposure image with the camera using the fixed predetermined exposure value, wherein the first exposure image is a dark exposure image; send instructions for the camera to use the exposure value to capture a second exposure image with the camera; and use the first exposure image and the second exposure image to control a vehicle in an autonomous mode.

In one example, the second exposure image includes a second scene and the processor is also configured to process the second exposure image to determine a second exposure value for capturing an average amount of light for the second scene with the camera and send instructions to use the second exposure value to capture a second light exposure image with the camera. In another example, the system also includes the camera. In this example, the memory and processor are incorporated into the camera.

DETAILED DESCRIPTION

The present disclosure relates to capturing images for processing. For example, an autonomous vehicle may use camera images to identify different types of objects, including, for example, emissive and passive objects. In one aspect, two different types of images may be captured: a dark exposure for detecting light emitting objects and a light exposure for detecting passive objects. In order to do so, a camera may capture an image of the autonomous vehicle's environment. This image may be considered a calibration image and may be processed to determine ideal camera settings for capturing the average intensity of the environment. Fixed offset values may be added to these ideal camera settings. These adjusted ideal camera settings are then used to capture a first exposure, where the first exposure is a dark exposure. The ideal camera settings may also be used to capture a second exposure where the second exposure is a normal exposure. Thus, in this context, the settings for the normal exposure may be appropriate to capture an average amount of light at the time that the calibration image was captured. This second exposure image may be processed to determine new ideal camera settings. Again, the fixed offset values may be added to the new ideal camera settings, and these new adjusted ideal settings may be used to capture a third exposure, where the third exposure is also a dark exposure. This process may repeat continuously and periodically, and the resulting images are sent for processing to identify objects. These identified objects may then be used to control the autonomous vehicle.

Figure 1:
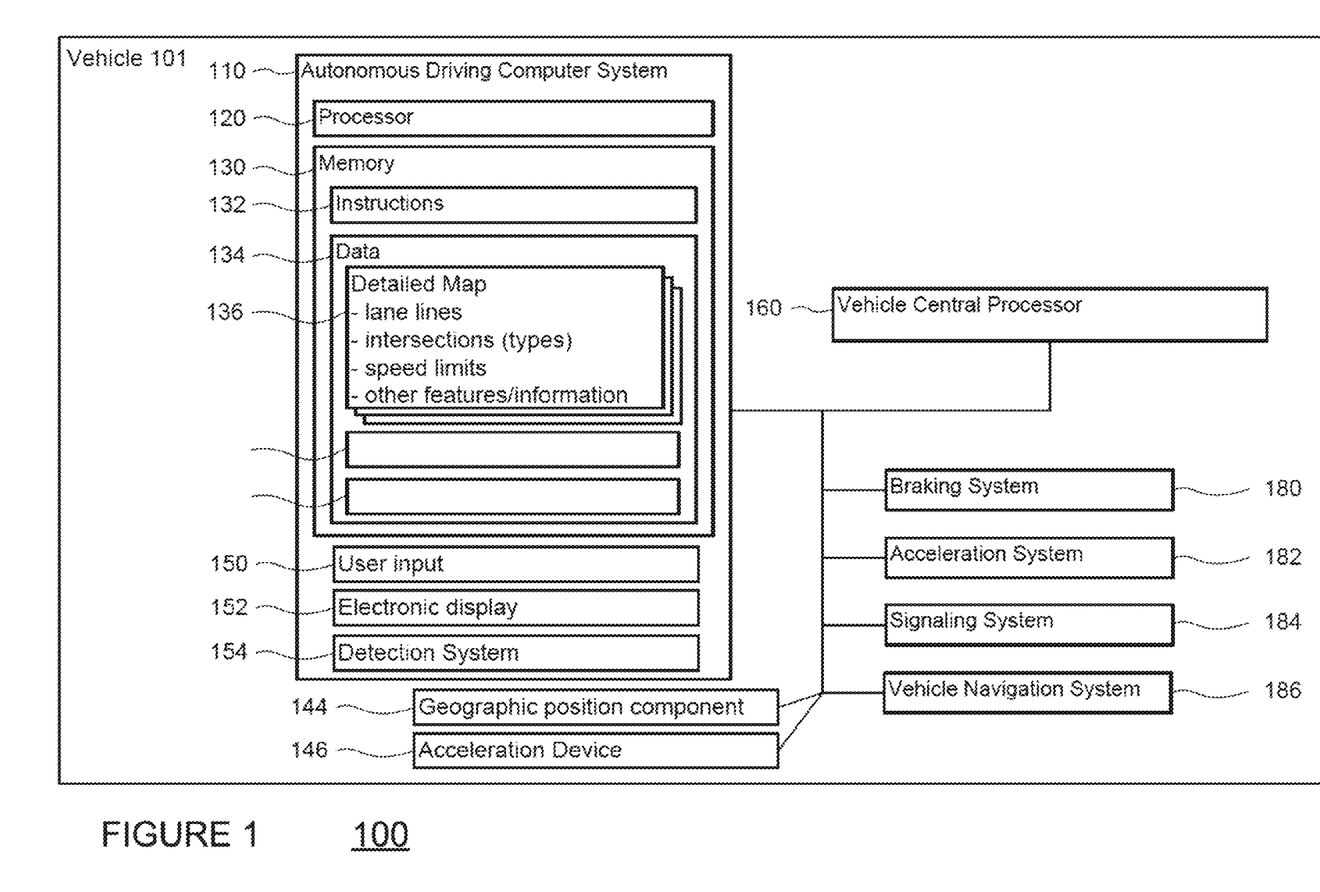
FIG. 1 is a functional diagram of a system in accordance with aspects of the disclosure.

As shown in FIG. 1, an autonomous driving system 100 associated with an autonomous vehicle. In this regard, vehicle 101 may include an autonomous vehicle. While certain aspects of the disclosure are particularly useful in connection with specific types of vehicles, the vehicle may be any type of vehicle including, but not limited to, cars, trucks, motorcycles, busses, boats, airplanes, helicopters, lawnmowers, recreational vehicles, amusement park vehicles, farm equipment, construction equipment, trams, golf carts, trains, and trolleys. The vehicle may have one or more computers, such as computer 110 containing a processor 120, memory 130 and other components typically present in general purpose computers.

The memory 130 stores information accessible by processor 120, including instructions 132 and data 134 that may be executed or otherwise used by the processor 120. The memory 130 may be of any type capable of storing information accessible by the processor, including a computer-readable medium, or other medium that stores data that may be read with the aid of an electronic device, such as a hard-drive, memory card, ROM, RAM, DVD or other optical disks, as well as other write-capable and read-only memories. Systems and methods may include different combinations of the foregoing, whereby different portions of the instructions and data are stored on different types of media.

The instructions 132 may be any set of instructions to be executed directly (such as machine code) or indirectly (such as scripts) by the processor. For example, the instructions may be stored as computer code on the computer-readable medium. In that regard, the terms "instructions" and "programs" may be used interchangeably herein. The instructions may be stored in object code format for direct processing by the processor, or in any other computer language including scripts or collections of independent source code modules that are interpreted on demand or compiled in advance. Functions, methods and routines of the instructions are explained in more detail below.

The data 134 may be retrieved, stored or modified by processor 120 in accordance with the instructions 132. For instance, although the claimed subject matter is not limited by any particular data structure, the data may be stored in computer registers, in a relational database as a table having a plurality of different fields and records, XML documents or flat files. The data may also be formatted in any computer-readable format. By further way of example only, image data may be stored as bitmaps comprised of grids of pixels that are stored in accordance with formats that are compressed or uncompressed, lossless (e.g., BMP) or lossy (e.g., JPEG), and bitmap or vector-based (e.g., SVG), as well as computer instructions for drawing graphics. The data may comprise any information sufficient to identify the relevant information, such as numbers, descriptive text, proprietary codes, references to data stored in other areas of the same memory or different memories (including other network locations) or information that is used by a function to calculate the relevant data.

The processor 120 may be any conventional processor, such as commercially available CPUs. Alternatively, the processor may be a dedicated device such as an ASIC or other hardware-based processor. Although FIG. 1 functionally illustrates the processor, memory, and other elements of computer 110 as being within the same block, it will be understood by those of ordinary skill in the art that the processor, computer, or memory may actually comprise multiple processors, computers, or memories that may or may not be stored within the same physical housing. For example, memory may be a hard drive or other storage media located in a housing different from that of computer 110. Accordingly, references to a processor or computer will be understood to include references to a collection of processors or computers or memories that may or may not operate in parallel. Rather than using a single processor to perform the steps described herein, some of the components, such as steering components and deceleration components, may each have their own processor that only performs calculations related to the component's specific function.

In various aspects described herein, the processor may be located remote from the vehicle and communicate with the vehicle wirelessly. In other aspects, some of the processes described herein are executed on a processor disposed within the vehicle and others by a remote processor, including taking the steps necessary to execute a single maneuver.

Computer 110 may include all of the components normally used in connection with a computer such as a central processing unit (CPU), memory (e.g., RAM and internal hard drives) storing data 134 and instructions such as a web browser, an electronic display 152 (e.g., a monitor having a screen, a small LCD touch-screen or any other electrical device that is operable to display information), user input 150 (e.g., a mouse, keyboard, touch screen and/or microphone), as well as various sensors (e.g., a video camera) for gathering explicit (e.g., a gesture) or implicit (e.g., "the person is asleep") information about the states and desires of a person.

Figure 2:
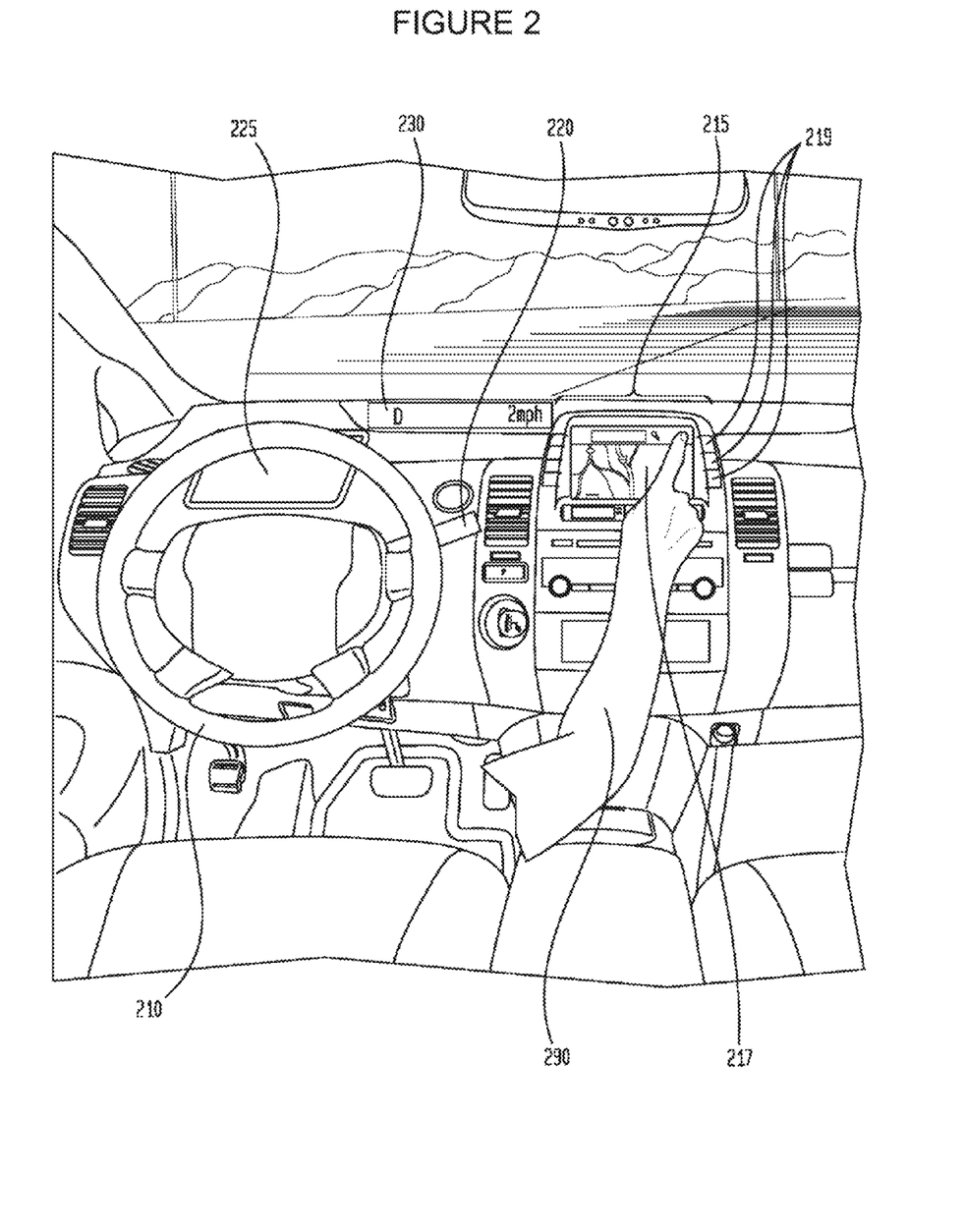
FIG. 2 is an interior of an autonomous vehicle in accordance with aspects of the disclosure.

In one example, computer 110 may be an autonomous driving computing system incorporated into vehicle 101. FIG. 2 depicts an exemplary design of the interior of an autonomous vehicle. The autonomous vehicle may include all of the features of a non-autonomous vehicle, for example: a steering apparatus, such as steering wheel 210; a navigation display apparatus, such as navigation display 215 (which may be a part of electronic display 152); and a gear selector apparatus, such as gear shifter 220. The vehicle may also have various user input devices 140 in addition to the foregoing, such as touch screen 217 (which may be a part of electronic display 152), or button inputs 219, for activating or deactivating one or more autonomous driving modes and for enabling a driver or passenger 290 to provide information, such as a navigation destination, to the autonomous driving computer 110.

The autonomous driving computing system may be capable of communicating with various components of the vehicle. For example, returning to FIG. 1, computer 110 may be in communication with the vehicle's central processor 160 and may send and receive information from the various systems of vehicle 101, for example the braking system 180, acceleration system 182, signaling system 184, and navigation system 186 in order to control the movement, speed, etc. of vehicle 101. In one example, the vehicle's central processor 160 may perform all of the functions of a central processor in a non-autonomous computer. In another example, processor 120 and 160 may comprise a single processing device or multiple processing devices operating in parallel.

In addition, when engaged, computer 110 may control some or all of these functions of vehicle 101 and thus be fully or partially autonomous. It will be understood that although various systems and computer 110 are shown within vehicle 101, these elements may be external to vehicle 101 or physically separated by large distances.

The vehicle may also include a geographic position component 144 in communication with computer 110 for determining the geographic location of the device. For example, the position component may include a GPS receiver to determine the device's latitude, longitude and/or altitude position. Other location systems such as laser-based localization systems, inertial-aided GPS, or camera-based localization may also be used to identify the location of the vehicle. The location of the vehicle may include an absolute geographical location, such as latitude, longitude, and altitude as well as relative location information, such as location relative to other cars immediately around it, which can often be determined with better accuracy than absolute geographical location.

The vehicle may also include other devices in communication with computer 110, such as an accelerometer, gyroscope or another direction/speed detection device 146 to determine the direction and speed of the vehicle or changes thereto. By way of example only, acceleration device 146 may determine its pitch, yaw or roll (or changes thereto) relative to the direction of gravity or a plane perpendicular thereto. The device may also track increases or decreases in speed and the direction of such changes. The device's provision of location and orientation data as set forth herein may be provided automatically to the user, computer 110, other computers and combinations of the foregoing.

The computer 110 may control the direction and speed of the vehicle by controlling various components. By way of example, if the vehicle is operating in a completely autonomous driving mode, computer 110 may cause the vehicle to accelerate (e.g., by increasing fuel or other energy provided to the engine), decelerate (e.g., by decreasing the fuel supplied to the engine or by applying brakes) and change direction (e.g., by turning the front two wheels).

The vehicle may also include components for detecting objects external to the vehicle such as other vehicles, obstacles in the roadway, traffic signals, signs, trees, etc. The detection system 154 may include lasers, sonar, radar, cameras or any other detection devices which record data which may be processed by computer 110. As an example, the cameras may be mounted at predetermined distances so that the parallax from the images of two or more cameras may be used to compute the distance to various objects.

Figure 3:
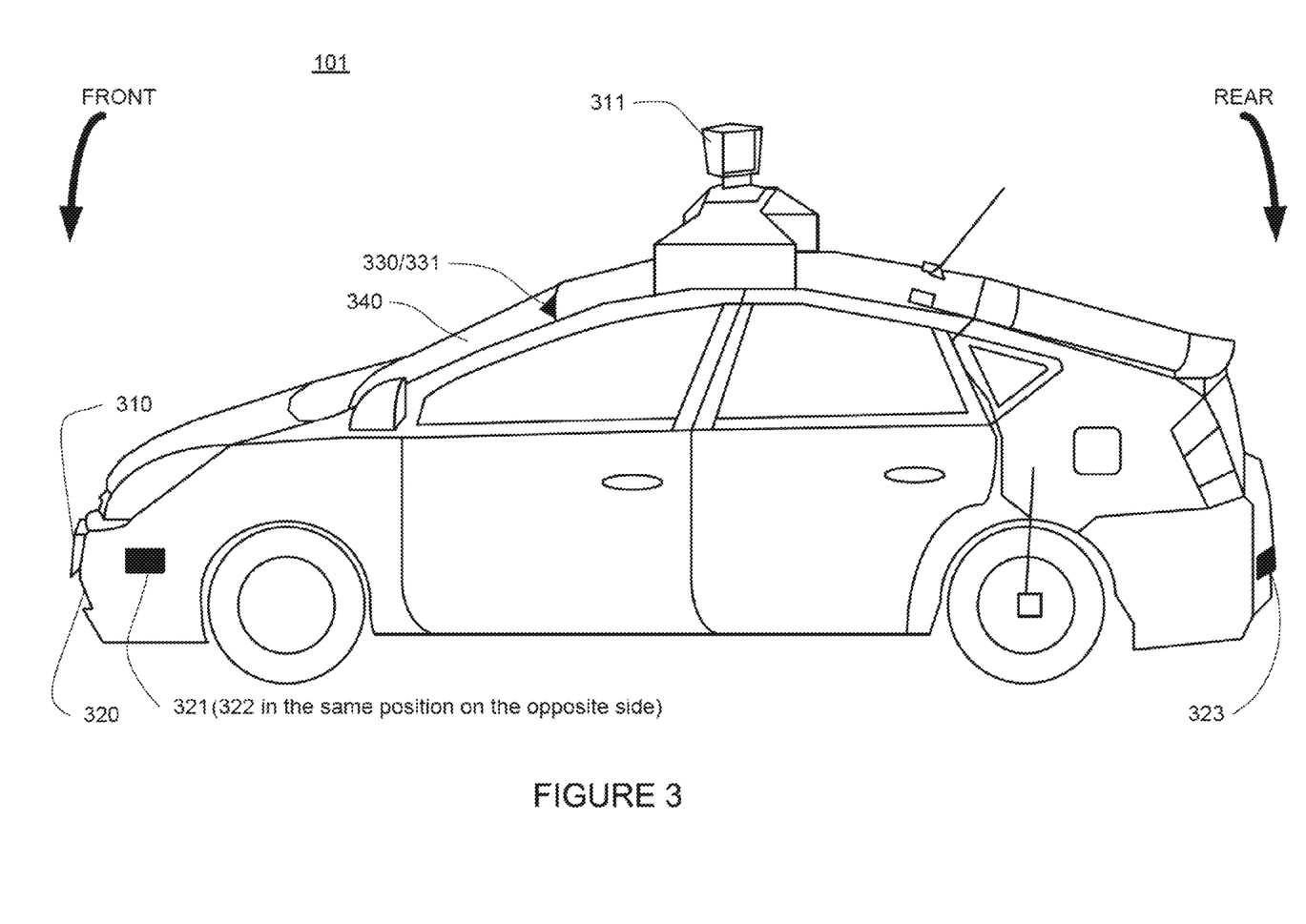
FIG. 3 is an exterior of an autonomous vehicle in accordance with aspects of the disclosure.

If the vehicle is a small passenger vehicle, the vehicle may include various sensors mounted on the roof or at other convenient location. As shown in FIG. 3, vehicle 101 may include a small passenger vehicle having lasers 310 and 311, mounted on the front and top of the vehicle, respectively. Vehicle 101 also includes radar detection units 320-323 located on the side (only one side being shown), front and rear of the vehicle. Vehicle 101 includes two cameras 330-331 mounted under a windshield 340 near the rear view mirror (not shown). Camera 330 may include a range of approximately 200 meters and an approximately 30 degree horizontal field of view, while camera 331 may include a range of approximately 100 meters and an approximately 60 degree horizontal field of view.

The vehicle's cameras may be configured to send and receive information directly or indirectly with the vehicle's autonomous driving system. For example, camera 330 and/or 331 may be hard wired to computer 110 or may send and receive information with computer 110 via a wired or wireless network of vehicle 101. Camera 330 and/or 331 may receive instructions from computer 110, such as image setting values, and may provide images and other information to computer 110. Each camera may also include a processor and memory configured similarly to processor 120 and memory 130 described above.

In addition to the sensors described above, the computer may also use input from other sensors and features typical to non-autonomous vehicles. For example, these other sensors and features may include tire pressure sensors, engine temperature sensors, brake heat sensors, break pad status sensors, tire tread sensors, fuel sensors, oil level and quality sensors, air quality sensors (for detecting temperature, humidity, or particulates in the air), door sensors, lights, wipers, etc. This information may be provided directly from these sensors and features or via the vehicle's central processor 160.

Many of these sensors provide data that is processed by the computer in real-time, that is, the sensors may continuously update their output to reflect the environment being sensed at or over a range of time, and continuously or as-demanded provide that updated output to the computer so that the computer can determine whether the vehicle's then-current direction or speed should be modified in response to the sensed environment.

In addition to processing data provided by the various sensors, the computer may rely on environmental data that was obtained at a previous point in time and is expected to persist regardless of the vehicle's presence in the environment. For example, returning to FIG. 1, data 134 may include detailed map information 136, e.g., highly detailed maps identifying the shape and elevation of roadways, lane lines, intersections, crosswalks, speed limits, traffic signals, buildings, signs, real time traffic information, vegetation, or other such objects and information.

In some examples, the detailed map information may include information about reference objects. These reference objects may include objects which may be detected at relatively long distances by the autonomous vehicle's sensors, such as road signs, bright lights, or any other objects having retro reflective, high intensity, or high brightness characteristics.

The map information may also include three-dimensional terrain maps incorporating one or more of objects listed above. For example, the vehicle may determine that another object, such as a vehicle, is expected to turn based on real-time data (e.g., using its sensors to determine the current GPS position of another vehicle and whether a turn signal is blinking) and other data (e.g., comparing the GPS position with previously-stored lane-specific map data to determine whether the other vehicle is within a turn lane).

Although the detailed map information 136 is depicted herein as an image-based map, the map information need not be entirely image based (for example, raster). For example, the map information may include one or more roadgraphs or graph networks of information such as roads, lanes, intersections, and the connections between these features. Each feature may be stored as graph data and may be associated with information such as a geographic location whether or not it is linked to other related features. For example, a stop sign may be linked to a road and an intersection. In some examples, the associated data may include grid-based indices of a roadgraph to promote efficient lookup of certain roadgraph features.

In addition to the operations described above and illustrated in the figures, various operations will now be described. It should be understood that the following operations do not have to be performed in the precise order described below. Rather, various steps can be handled in a different order or simultaneously, and steps may also be added or omitted.

Figure 4:
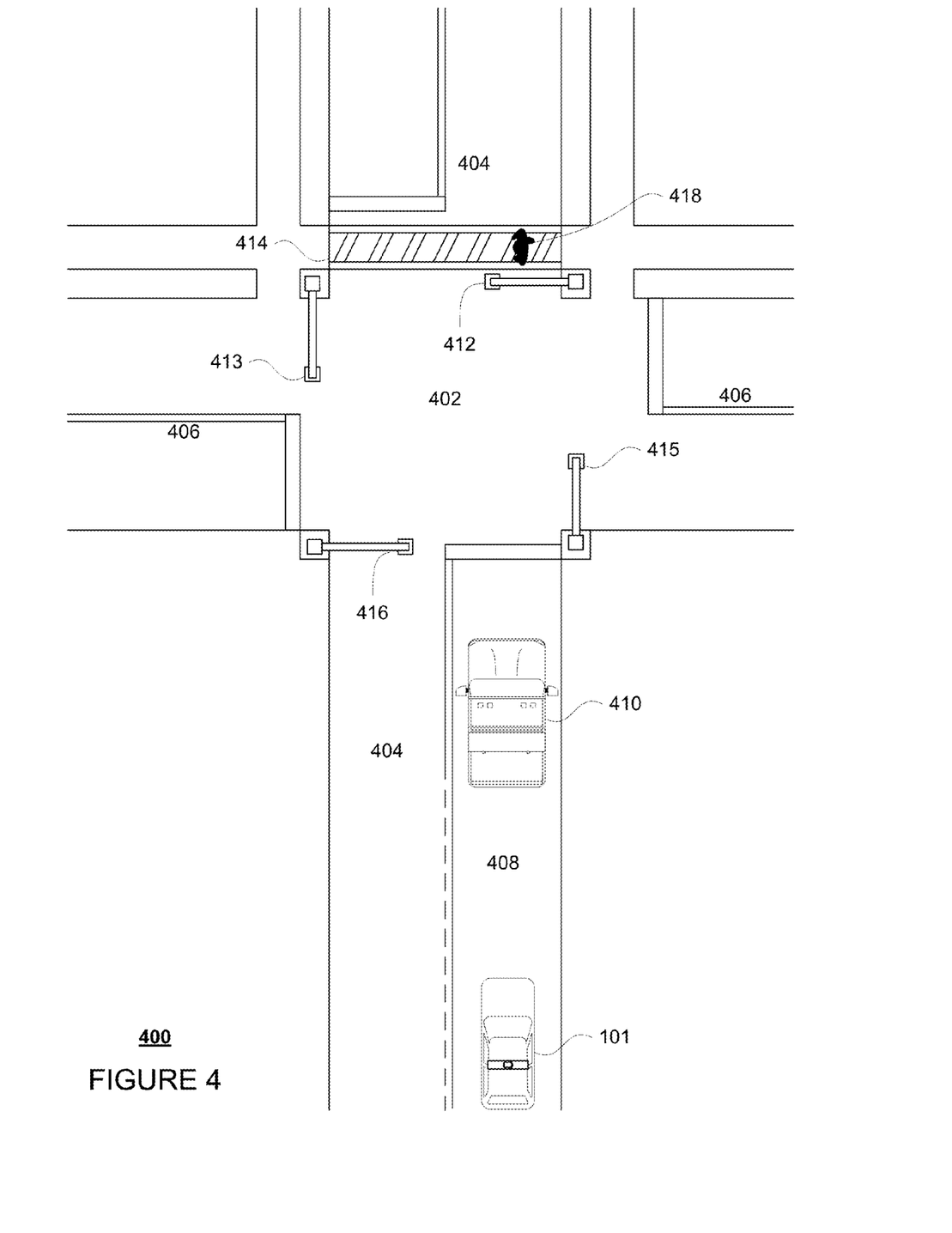
FIG. 4 is an example birds-eye view of an intersection in accordance with aspects of the disclosure.

An autonomous vehicle may be driven along a roadway. FIG. 4 is an example of a birds-eye view 400 of vehicle 101 approaching an intersection 402 of roadways 404 and 406. In this example, vehicle 101 is driving north in lane 408 of road 404. In front of vehicle 101 is another vehicle 410 also in lane 408 approaching intersection 402. The intersection 402 includes four traffic signals 412, 413, 415 and 416 a cross walk 414. A person 418 is crossing road 404 in cross walk 414.

As noted above, in addition to other sensor data, the autonomous vehicle may use camera images to identify different types of objects, including emissive and passive objects, in the vehicle's environment. For example, computer 110 of vehicle 101 may send and receive information from cameras 330 and/or 331. Computer 110 may process images from these cameras in order to detect the location of both emissive and passive objects in vehicle 101's environment, for example, using the parallax from the images of these cameras to compute the distance to various objects.

In order detect these objects, an initial image is captured and processed to identify ideal settings for capturing the average amount of light or average intensity of scene captured in the initial image. In other words, the initial image is processed to determine settings, for the camera that captured in the initial image that would capture the average amount of intensity if the same scene were captured again with the same lighting conditions.

Figure 5:
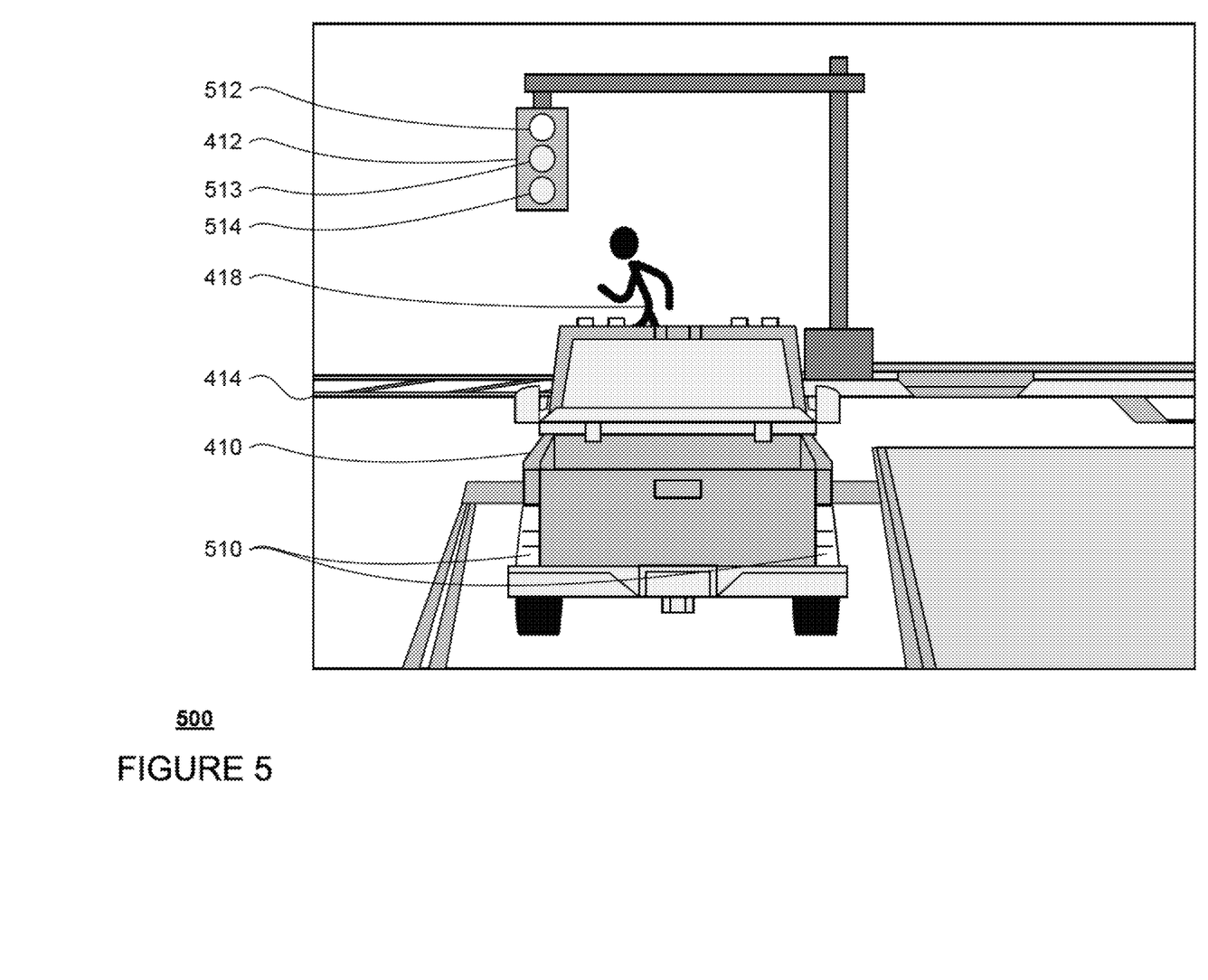
FIG. 5 is an example image in accordance with aspects of the disclosure.

As an example, the camera, here camera 330 (or camera 331), first captures an image. This initial image may be un-calibrated or other default or automatic camera settings may be used. For example, FIG. 5 is an example of an image 500 of portions of view 400 captured by camera 330 (or 331) using default or calibrated settings. In this example, the scene of image 500 includes portions of vehicle 410, cross walk 414, person 418 and traffic signal 412. Image 500 also includes passive objects such as person 418 and emissive objects such as taillights 510 of vehicle 410 as well as traffic signal lights 512, 513, and 514 of traffic signal 412. In this example, traffic signal light 512 is lit while traffic signal lights 513 and 514 are not. The image is then sent to and processed by computer 110 to identify the ideal gain, shutter time, and white balance for the camera that captured the image for capturing the average amount of light or intensity in image 500.

These ideal camera settings may be determined in any number of ways. As an example, one approach may be to determine the ideal settings from a particular image and then update these settings based on any changes to the vehicle's environment. Another may be to determine an incremental change to the current settings based on whether the current image (and potentially previous images) is too light or dark. These incremental changes may continue until they roughly converge on ideal settings, which may change as the lighting in the environment changes.

An example of how ideal camera settings are determined may include attempting to maintain the mean intensity of the prior normal exposure image in the range [I_min, I_max], by varying the shutter time in the allowed range [s_min, s_max], and gain between [g_min, g_max]. The value s_max may be limited to a fixed value such as 10 milliseconds in order to limit motion blur. In this example, if the intensity is in [I_min, I_max] already, the shutter time and the gain need not be changed. If the intensity is less than I_min (i.e., the image is too dark), then the shutter time may be increased using a "logarithmic proportional controller" described below. If the shutter time reaches s_max and the image is still too dark, then gain may be increased using a "linear proportional controller" described below. If the intensity is greater than I_max (i.e., the image is too bright), then the gain may be decreased using the linear proportional controller. If the gain reaches g_min and the image is still too bright, the shutter time may be decreased using the logarithmic proportional controller.

A linear proportional controller, as mentioned above, may changes a value y in the range [y_min, y_max] until a measured value x lies in a desired range [x_min, x_max]. If x is outside its range, then y=y+alpha*(x−((x_min+x_max)/2)). In this example, alpha controls how fast y is updated over time. A logarithmic proportional controller, as mentioned above, may change a value y in the range [y_min, y_max] until a measured value x lies in a desired range [x_min, x_max]. If x is outside its range, then y=y*exp(alpha*(log(x)−log((x_min+x_max)/2))). Again, alpha controls how fast y is updated over time.

Thus, in one example, the computer 110 may use logarithmic control for shutter time and linear control for gain. This may allow the shutter time to change slowly at low values and faster and high values. If a linear controller is used for shutter time, the shutter time may jump around too fast at low values. The constants alpha in the two cases described above may ensure that the computer 110 alters settings smoothly over a few seconds in response to fluctuations in observed exposure. For example, if vehicle 101 emerges from a dark tunnel into sunlight, computer 110 can adjust the image settings in a couple of seconds just like human eyes.

The autonomous vehicle's computer then determines the camera settings for a dark exposure image. For example, computer 110 may retrieve the fixed offset values from camera settings 138. These fixed offset values for gain, shutter time, and white balance may be added to the ideal camera settings resulting in adjusted ideal settings. Alternatively, the camera settings for the dark exposure image may use a combination of fixed offset values and fixed predetermined values. As an example, the shutter time for the dark exposure image may always be a fixed amount of time, such as 100 microseconds in order to limit motion blur. In such an example, the gain and/or shutter time may be determined by adding a fixed offset value to the ideal camera settings. The computer 110 may send these determined and/or adjusted ideal settings to the camera 330 or 331 with instructions to capture an image.

Figure 6:
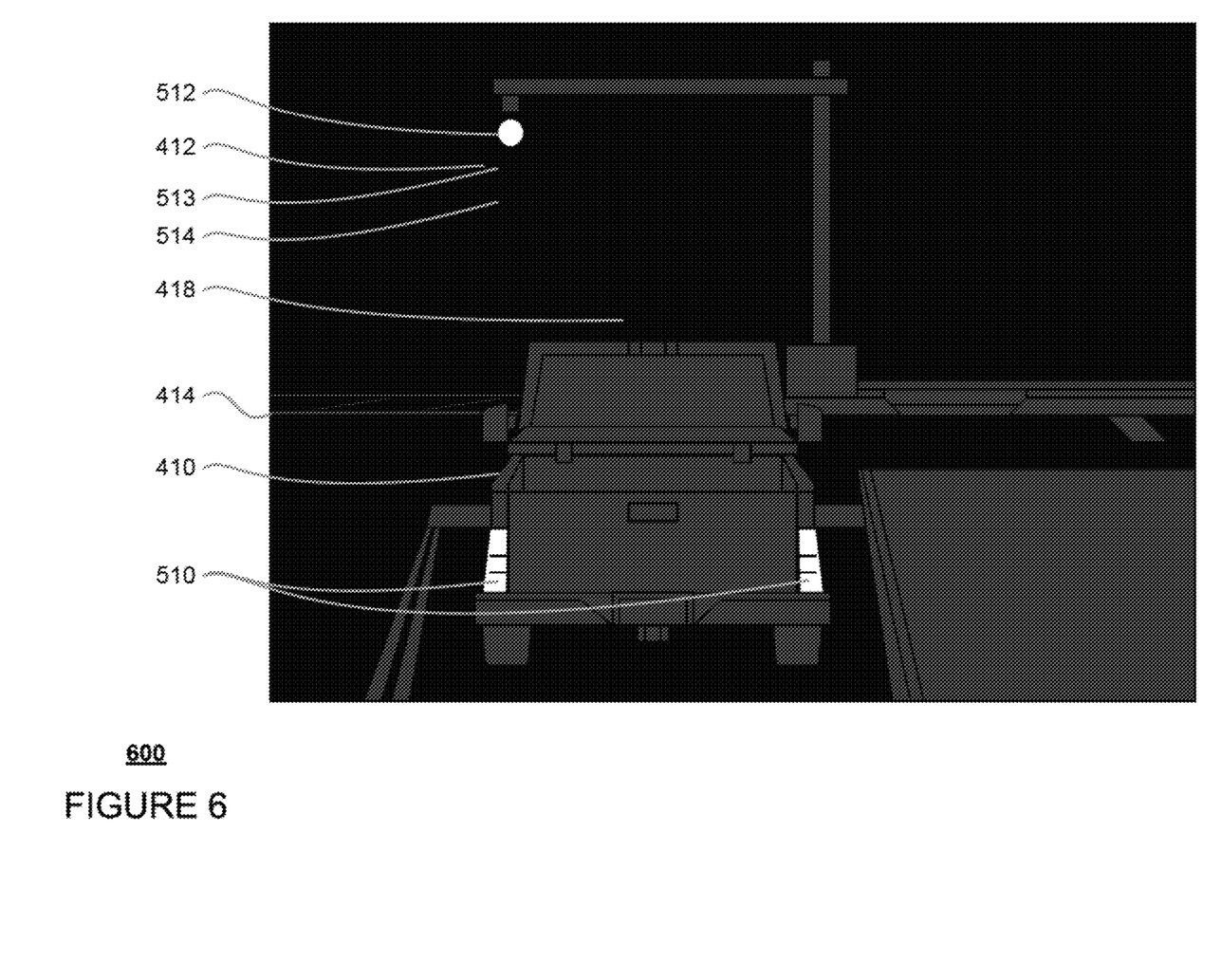
FIG. 6 is another example image in accordance with aspects of the disclosure.

The camera may capture a dark exposure image using the adjusted ideal settings. The camera may send the image to computer 110 for processing to detect emissive objects. FIG. 6 is an example of a dark exposure image 600 that includes the same features of image 500 but utilizes the fixed offset values from the average amount of light or intensity in image 500.

The autonomous vehicle's computer may use this dark exposure image to detect emissive objects. In the example of image 600, the emissive objects, taillights 510, and traffic signal light 512 are clearly identified, while the passive objects, such as person 418, are less visible or not distinguishable at all. Thus, computer 110 may easily identify these emissive objects in the image 600 and use this information, for example, to control vehicle 101.

Figure 7:
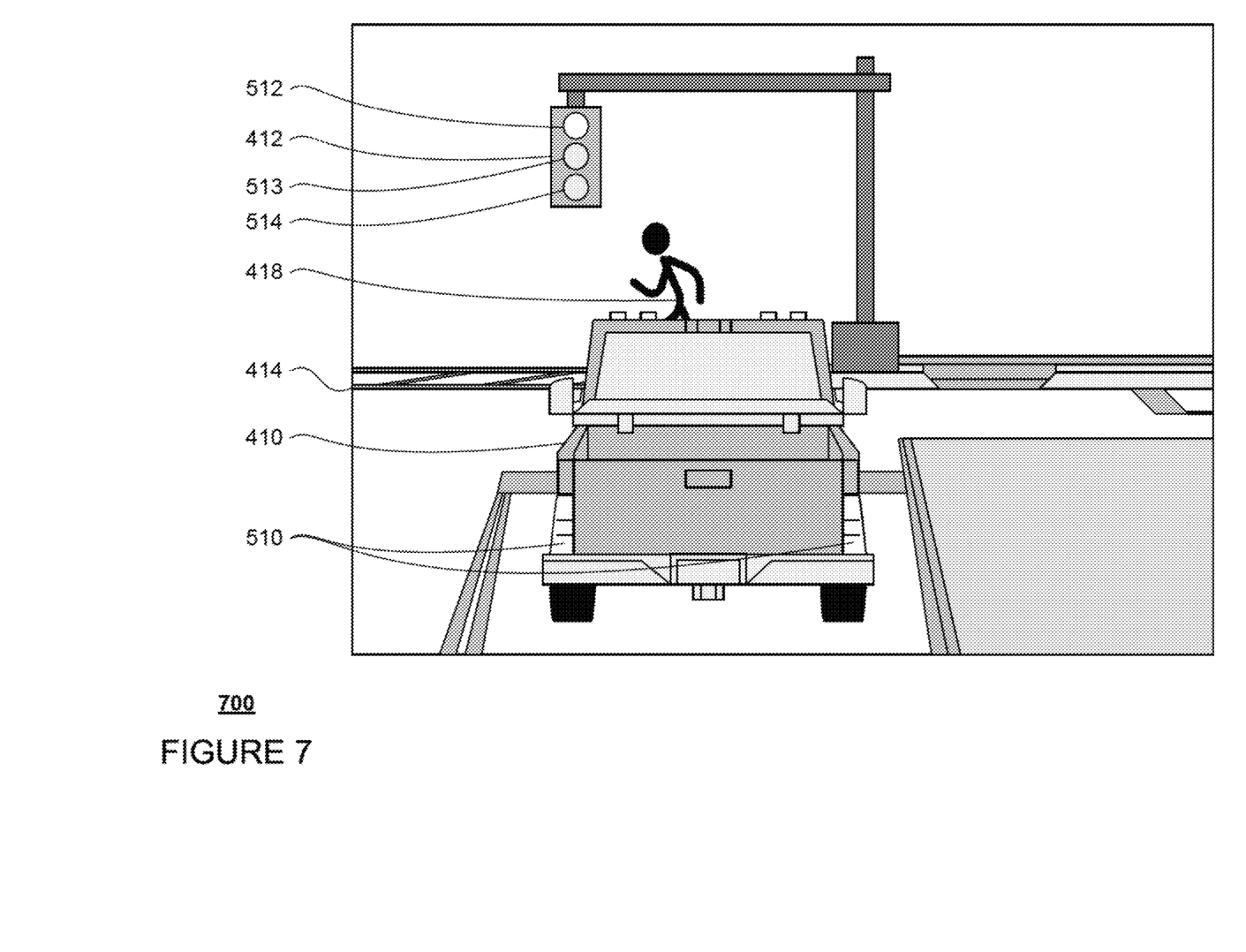
FIG. 7 is another example image in accordance with aspects of the disclosure.

The ideal camera settings may then be used to capture a normal exposure. This normal exposure image can be used to identify passive objects. FIG. 7 is an example of a light exposure 700 that includes the same features of image 500 but utilizes the fixed offset values from the average amount of light or intensity determined using image 500. Thus, in this image, person 418 is easily visible and may be identified by computer 110. As noted above, computer 110 may then use this information, for example, to control vehicle 101.

As noted above, the normal exposure may also be processed to determine new camera settings for average amount of light or intensity. Although the scene of image 700 is identical to the scene of image 500, by the time image 700 is captured vehicle 101 may have moved and/or the lighting conditions may have changed, so the vehicle's environment may actually have different light or intensity characteristics from images 500.

Again, the fixed offset values are added to the new ideal camera settings and a dark exposure is captured. In this regard, the camera settings may be changed based on the ambient lighting or the amount of light in the vehicle's environment. This may repeat continuously and periodically, and the resulting images are sent to the autonomous vehicle's computer for processing to identify objects as described above. These identified objects, in turn, may be used by the vehicle's computer to control and/or maneuver the autonomous vehicle.

Figures 8A, 8B:
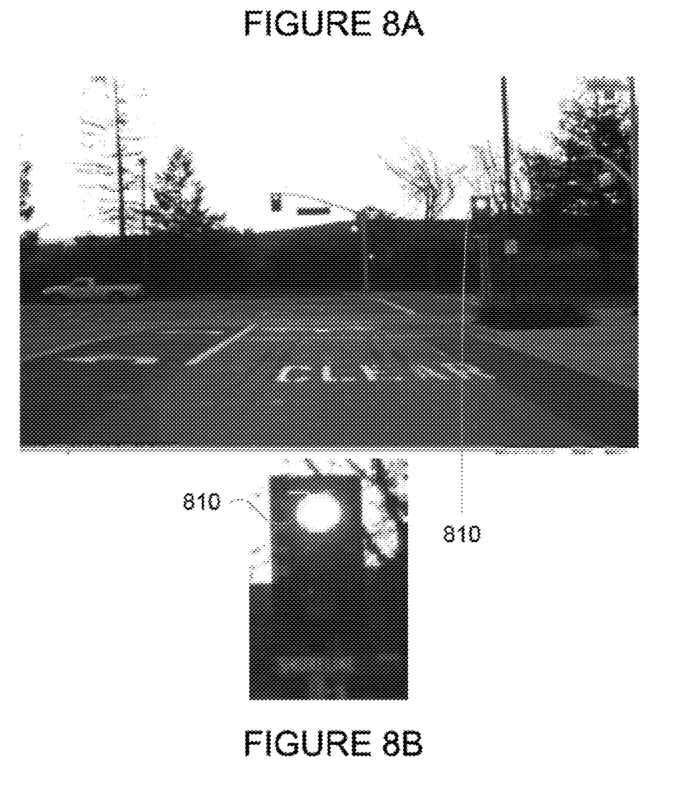
FIGS. 8A-8D are additional example images in accordance with aspects of the disclosure.
Figures 8C, 8D:
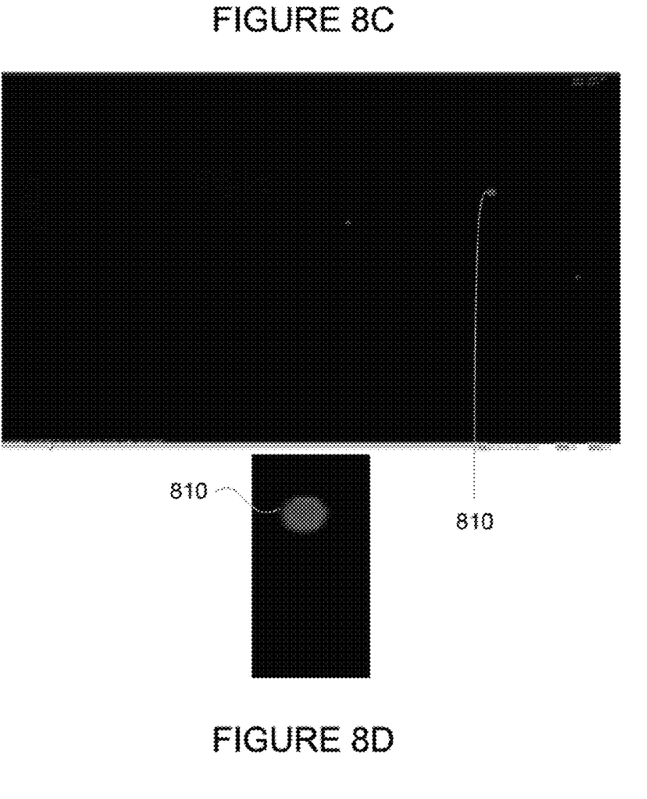

FIGS. 8A-8D are examples of actual normal and dark exposure images of overlapping scenes. In this example, FIG. 8A depicts a normal exposure image of a scene including a traffic signal light 810. FIG. 8B is a close up view of traffic signal light 810 of FIG. 8A. FIG. 8C is an example of a dark exposure image 8C having a scene which overlaps with the scene of FIG. 8A. FIG. 8C also includes the traffic signal light 810, and FIG. 8D is a close up view of the traffic signal light 810 of FIG. 8C. As can be seen from this example, objects in the normal exposure image of FIG. 8A are not actually visible in the dark exposure image of FIG. 8D. In these examples, the red color of the traffic light appears washed-out and almost white in the normal exposure, but is properly captured in the dark exposure.

Although the examples above describe capturing a dark exposure image with adjusted camera settings and then capturing a normal exposure image using the camera settings, the images may also be captured in reverse order. For example, the normal exposure image using the camera settings may be captured before the dark exposure image using the adjusted camera settings.

Figure 9:
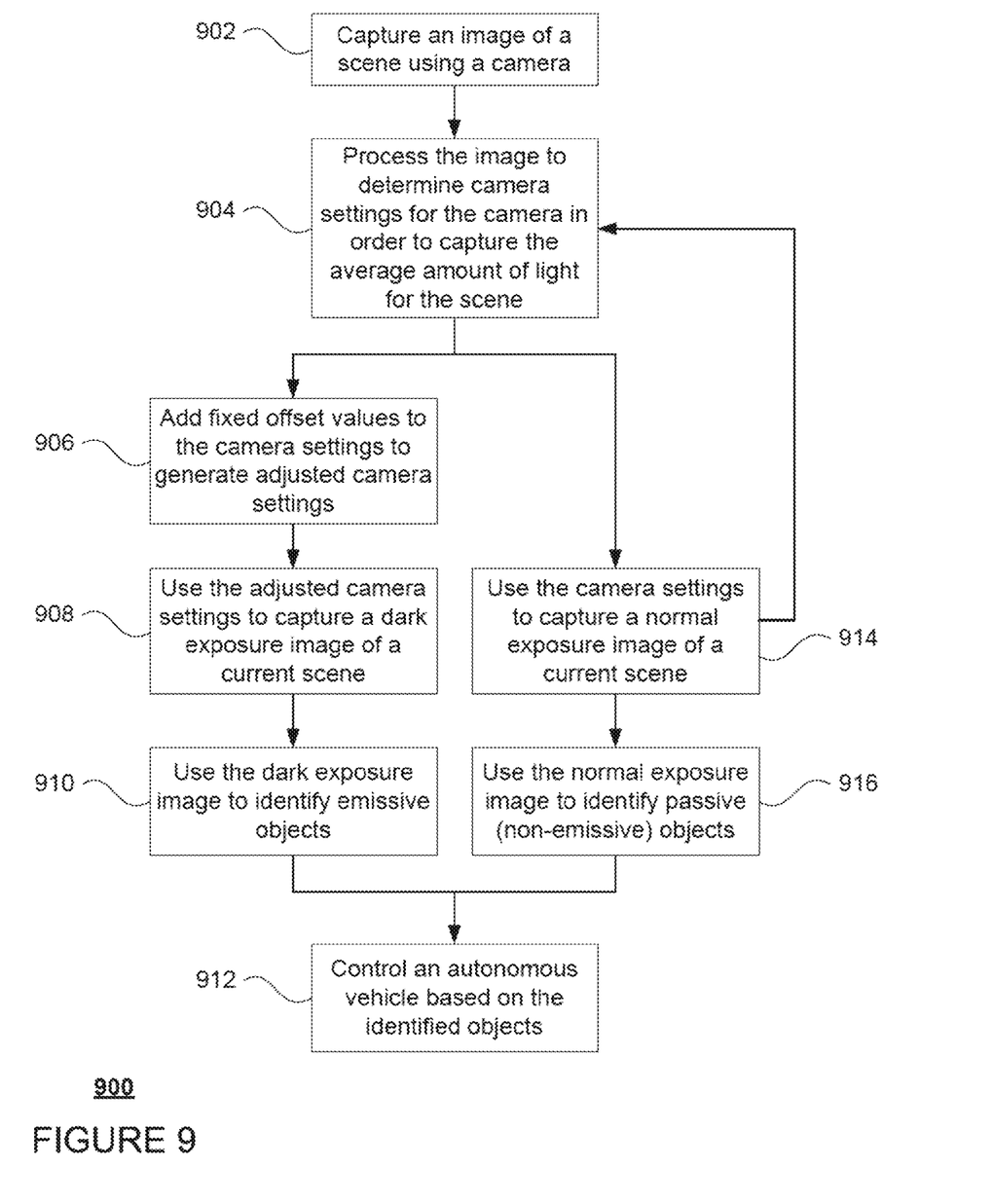
FIG. 9 is a flow diagram in accordance with aspects of the disclosure.

FIG. 9 is an example of a flow diagram including some of the features described above. These steps may be performed, for example, by computer 110 of vehicle 101 or by a processor of camera 330 or 331. In this example, an image of a scene, for example a scene including portions of an autonomous vehicle's environment, is captured at block 902. This image is processed to determine camera settings for the camera in order to capture the average amount of light or average intensity for the scene at block 904. Fixed offset values are added to the camera settings to generated adjusted camera settings at block 906. The adjusted camera settings are used to capture a dark exposure image of a current scene at block 908. For example, a scene including portions of an autonomous vehicle's environment may be captured as described above. This scene may be the same or different from the scene captured at block 902 depending upon whether the autonomous vehicle has moved. This dark exposure image is used to identify emissive objects at block 910. Any identified objects are then used to control an autonomous vehicle at block 912.

Returning to block 904, in addition to adding fixed offset values and capturing a dark exposure image, the camera settings are also used to capture a normal exposure image of a current scene at block 914. Again, this scene may be the same or different from the scene captured at blocks 902 and/or 908 depending upon whether the autonomous vehicle has moved. This normal exposure image is used to identify passive objects at block 916. Again, one or more of the identified objects are then used to control an autonomous vehicle at block 912.

Returning to block 914, once the camera settings are used to capture a normal exposure image of a current scene, this image is then processed at block 904 to determine new camera settings. These camera settings may be the same or different as those used to capture the normal exposure image at block 916 depending upon whether the autonomous vehicle has moved or the ambient lighting has changed since the image captured at block 902 was captured. As noted above, these blocks may be repeated continuously such that the camera settings are continuously updated.

Although the examples above discuss determining and adjusting settings for a single camera, these same functions may be repeated in parallel and used to adjust the setting for multiple cameras, for example, for both cameras 330 and 331. This may allow the autonomous vehicle's computer to take two dark exposure images and two normal exposure images with different fields of view providing the autonomous vehicle's computer with even more information about emissive and passive objects in the vehicle's environment, and allowing for faster computing of these object's location using the parallax as described above. In another example, each of the two cameras can use different exposure settings. In this example, camera 330 may capture all of the normal exposure images while camera 331 may capture all of the dark exposure images using any of the techniques described herein. In addition, rather than processing the images and controlling the camera by the autonomous vehicle's computer, both cameras 330 and 331, may perform these functions without receiving instructions from the autonomous vehicle's computer. Alternatively, only a single camera, e.g. camera 330 or camera 331, may perform these functions and send instructions to the other camera to adjust its setting accordingly.

Rather than using fixed offset values to capture the dark exposure, other values may be used. As an example, the camera may use fixed exposure values for the dark exposure. Returning to the examples of FIGS. 5 and 6, FIG. 6 may thus include an image 600 that was captured using fixed predetermined camera settings, rather than values that were added to the ideal camera settings for capturing the average intensity of the image 500 of FIG. 5. Thus, every dark exposure image is captured using the same predetermined camera settings. Such a technique may be very beneficial in that it can save on processing time. In some examples, however, the same setting used for the dark exposure during the day may be less useful due to the ambient light from light emitting objects at night. For example, traffic signal lights may appear brighter at night.

To address this ambient lighting issue, the settings for the dark exposure may be fixed based on the time of day. However, this approach does not account for rapid changes in the lighting conditions, such as when the autonomous vehicle enters a tunnel or another object obstructs casts a shadow in the direction of the camera. In yet another example, the camera settings of the dark exposure may be determined based on a ratio of the number of lights detected to the number of lights expected, for example, from the detailed map information as well as the number of other emissive objects identified from the camera images.

In another alternative, rather than capturing different dark and normal exposures, a single image having different regions with different camera settings may be captured. For example, any of the examples for determining the light and dark exposure settings described above may be used, but every other row (or column) of pixels may be assigned different camera settings (light or dark exposure camera settings). In this regard, a single image may be produced which includes both types of exposures, but without requiring the merging of two images together.

Although the above examples describe the use of only two different types of exposures for two different types of processing jobs (one for detecting emissive objects and another for detecting passive objects), the features described above can be used to generate any number of different types of images. For example, other camera settings may be used to capture an image for each significantly different image processing task. Though typically, two types of images would be sufficient, and extremely useful, for the autonomous vehicle's tasks described above.

As explained above, the ambient lighting in a vehicle's environment can varies significantly in a single scene or over time. Developing image processing algorithms robust to this variation can be challenging. The features described herein allow for optimal image settings for different image processing tasks which may have very disparate constraints.

As an example, the features described above may allow a single camera to return multiple images using different camera settings, in particular gain, shutter time, white balance, etc. This in turn, allows the camera to provide the optimal image for each image processing task that the autonomous vehicle's computer is trying to perform. In other words, when the autonomous vehicle's computer is trying to detect emissive sources, more clearly differentiated in an image that is very dark, the camera settings are optimized for dark exposures in one frame. Similarly, when the autonomous vehicle's computer is trying to detect passive objects, more clearly differentiated in an image that has average light settings, the camera parameters are optimized for these light images in the next frame. Thus, a single camera may be set up to return multiple images each using a different set of camera settings allowing the autonomous vehicle's computer to select which type of image to use for different processing.

As these and other variations and combinations of the features discussed above can be utilized without departing from the subject matter as defined by the claims, the foregoing description of exemplary embodiments should be taken by way of illustration rather than by way of limitation of the subject matter as defined by the claims. It will also be understood that the provision of the examples described herein (as well as clauses phrased as "such as," "e.g.", "including" and the like) should not be interpreted as limiting the claimed subject matter to the specific examples; rather, the examples are intended to illustrate only some of many possible aspects.

The invention claimed is:

1. A method comprising:
    processing an image of a present scene in a vehicle's environment to determine a first exposure value for capturing an average amount of light for the present scene to identify objects in the present scene with a camera, the first exposure value including a shutter time value and a gain value;
    adding, by one or more processors, a fixed offset shutter time value to the shutter time value and a fixed offset gain value to the gain value to generate a second adjusted exposure value;
    using the second exposure value to capture a first exposure image with the camera, wherein the first exposure image is a dark exposure image;
    using the first exposure value to capture a second exposure image with the camera; and
    using the first exposure image and the second exposure image to control the vehicle in an autonomous mode, wherein the first exposure value is determined in order to maintain the average amount of light for the present scene in a predetermine range based on logarithmic control for the shutter time value and linear control for the gain value.

2. The method of claim 1, further comprising:
using the first exposure image to identify an emissive object in a scene of the first exposure image that emits light; and
using the identified emissive object to control the vehicle.

3. The method of claim 1, further comprising:
using the second exposure image to identify a passive object in a scene of the second exposure image that does not emit light; and
using the identified passive object to control the vehicle.

4. The method of claim 1, wherein the second exposure image includes a second scene and the method further comprises:
processing the second exposure image to determine a third exposure value for capturing an average amount of light for the second scene with the camera; and
using the third exposure value to capture a third exposure image with the camera.

5. The method of claim 4, further comprising:
adding the fixed offset value to the third exposure value to generate a fourth exposure value; and
using the fourth exposure value to capture a fourth exposure image with the camera, wherein the fourth exposure image is a second dark exposure image.

6. The method of claim 1, wherein the first exposure value is determined by maintaining the average amount of light for a previous scene of a previous exposure image captured prior to the image of the present scene using a previous exposure value by adjusting a shutter time value of the previous exposure value using logarithmic proportion control and adjusting the gain value of the previous exposure value using linear proportion control.

7. A method comprising:
processing a first image of a present scene in a vehicle's environment to determine a first exposure value for capturing an average amount of light for the present scene to identify objects in the present scene with a camera, the exposure value including a shutter time value and a gain value;
accessing memory to identify a fixed predetermined exposure value for capturing dark exposure images, the fixed predetermined exposure value includes a fixed shutter time value and a fixed gain value;
capturing, with the camera, a first exposure image using the fixed predetermined exposure value, wherein the first exposure image is a dark exposure image;
using the first exposure value to capture a second exposure image with the camera; and
using the first exposure image and the second exposure image to control the vehicle in an autonomous mode, wherein the first exposure value is determined in order to maintain the average amount of light for the present scene in a predetermine range based on logarithmic control for the shutter time value and linear control for the gain value.

8. The method of claim 7, wherein the second exposure image includes a second scene and the method further comprises:
processing the second exposure image to determine a second exposure value for capturing an average amount of light for the second scene with the camera; and
using the second exposure value to capture a third exposure image with the camera.

9. The method of claim 7, wherein the first exposure value is determined by maintaining the average amount of light for a previous scene of a previous exposure image captured prior to the image of the present scene using a previous exposure value by adjusting a shutter time value of the previous exposure value using logarithmic proportion control and adjusting a gain value of the previous exposure value using linear proportion control.

10. A system comprising one or more processors configured to:
process an image of a present scene in a vehicle's environment to determine a first exposure value for capturing an average amount of light for the present scene to identify objects in the present scene with a camera, the first exposure value including a shutter time value and a gain value;
add a fixed offset shutter time value to the shutter time value and a fixed offset gain value to the gain value to generate a second exposure value;
send instructions to use the adjusted exposure value to capture a first exposure image with a camera, wherein the first exposure image is a dark exposure image;
send instructions for the camera to use the camera setting to capture a second exposure image with the camera; and
use the first exposure image and the second exposure image to control the vehicle in an autonomous mode, wherein the first exposure value is determined in order to maintain the average amount of light for the present scene in a predetermine range based on logarithmic control for the shutter time value and linear control for the gain value.

11. The system of claim 10, wherein the one or more processors are further configured to:
use the first exposure image to identify an emissive object in a scene of the first exposure image that emits light; and
use the identified emissive object to control the vehicle.

12. The system of claim 10, wherein the one or more processors are further configured to:
use the second exposure image to identify a passive object in a scene of the second exposure image that does not emit light; and
use the identified passive object to control the vehicle.

13. The system of claim 10, wherein the second exposure image includes a second scene and the processor is further configured to:
process the second exposure image to determine a third exposure value for capturing an average amount of light for the second scene with the camera; and
send instructions to use the third exposure value to capture a third exposure image with the camera.

14. The system of claim 13, wherein the one or more processors further configured to:
add the fixed offset value to the third exposure value to generate a fourth exposure value; and
use the fourth exposure value to capture a fourth exposure image with the camera, wherein the fourth exposure image is a second dark exposure image.

15. The system of claim 10, further comprising the camera.

16. The system of claim 10, wherein the one or more processors are further configured to determine the first exposure value by maintaining the average amount of light for a previous scene of a previous exposure image captured prior to the image of the present scene using a previous exposure value by adjusting a shutter time value of the previous exposure value using logarithmic proportion control and adjusting a gain value of the previous exposure value using linear proportion control.

17. A system comprising:
  memory storing a fixed predetermined camera setting for capturing dark exposure images;
  one or more processors configured to:
    process an image of a present scene in a vehicle's environment to determine an first exposure value for capturing an average amount of light for the present scene to identify objects in the present scene with a camera, the first exposure value including a shutter time value and a gain value;
    access the memory for the fixed predetermined camera setting which includes a fixed shutter time value and a fixed gain value;
    send instructions to capture a first exposure image with the camera using the fixed predetermined camera setting, wherein the first exposure image is a dark exposure image;
    send instructions to use the camera setting to capture a second exposure image with the camera using the first exposure value; and
    use the first exposure image and the second exposure image to control the vehicle in an autonomous mode, wherein the first exposure value is determined in order to maintain the average amount of light for the present scene in a predetermine range based on logarithmic control for the shutter time value and linear control for the gain value.

18. The system of claim 17, wherein the second exposure image includes a second scene and the one or more processors are further configured to:
  process the second exposure image to determine a second exposure value for capturing an average amount of light for the second scene with the camera; and
  send instructions to use the second exposure value to capture a third exposure image with the camera.

19. The system of claim 17, further comprising the camera.

20. The system of claim 17, wherein the one or more processors are further configured to determine the first exposure value by maintaining the average amount of light for a previous scene of a previous exposure image captured prior to the image of the present scene using a previous exposure value by adjusting a shutter time value of the previous exposure value using logarithmic proportion control and adjusting a gain value of the previous exposure value using linear proportion control.

* * * * *